United States Patent Office 2,777,848
Patented Jan. 15, 1957

2,777,848
METHOD OF PREPARING GUANAMINES

Frederic C. Schaefer, Darien, Conn., assignor to American Cyanamid Company, New York, N. Y., a corporation of Maine No Drawing. Application August 5, 1955,
Serial No. 526,777

4 Claims. (Cl. 260—249.9)

The present invention relates to a method of preparing guanamines which conform to the formula

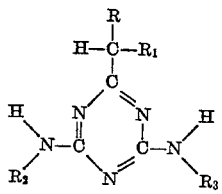

Wherein R stands for hydrogen or an alkyl radical, $R_1$ stands for hydrogen or an alkoxy radical, and $R_2$ and $R_3$ stand for hydrogen, an alkyl or an aryl radical.

In accordance with the present invention, the guanamine compounds may be readily prepared by reacting a nitrile of the formula

in which R and $R_1$ have the meaning shown above, with a biguanide of the formula

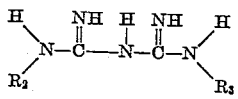

in which $R_2$ and $R_3$ have the meaning shown above, in the presence of a basic catalyst in an inert organic solvent.

Typical basic catalysts which may be employed in the process are the alkali metal hydroxides such as sodium hydroxide, potassium hydroxide or lithium hydroxide, an alkali metal alcoholate such as potassium methoxide, sodium ethoxide or sodium beta-ethoxy-ethoxide, and an alkali metal dicyandiamide such as sodium dicyanadiamide or potassium dicyandiamide. The quantity of the catalyst which is used is usually in the range of 0.05 to 0.25 mole per mole of nitrile employed.

Suitable solvents for the nitrile and biguanide reactants in the present process are the low molecular weight monoalkyl ethers of ethylene glycol such as beta-methoxyethanol, beta-ethoxyethanol or beta-butoxyethanol, and the aliphatic monohydric alcohols containing from four to six carbon atoms such as isobutyl alcohol, secondary amyl alcohol, isoamyl alcohol or n-hexyl alcohol.

The optimum reaction temperature varies somewhat with the specific nitrile and biguanide used, but in most reactions a temperature within the range of from about 75° C. to about 150° C. is preferred.

Typical nitriles employed in the process are acetonitrile, propionitrile, butyronitrile, valeronitrile, stearonitrile, ethoxyacetonitrile, isopropoxyacetonitrile, t-butoxyacetonitrile, α-methoxypropionitrile, α-propoxypropionitrile, α-t-butoxypropiontrile, α-hexoxypropionitrile, α-ethoxybutyronitrile, α-isopropoxybutyronitrile, α-methoxyvaleronitrile, α-isobutoxyvaleronitrile, and α-ethoxystearonitrile.

The biguanides which may be employed in the process are biguanide, the monoalkyl and monoaryl biguanides, and the 1,5-dialkyl and 1,5-diaryl biguanides. Typical substituted biguanides are methylbiguanide, isopropyl biguanide, butylbiguanide, octylbiguanide, dodecylbiguanide, octadecylbiguanide, phenylbiguanide, p-tolylbiguanide, 1-naphthylbiguanide, 1,5-diethylbiguanide, 1,5-dibutylbiguanide, 1,5-dihexylbiguanide, 1,5-didecylbiguanide, 1-methyl-5-isobutylbiguanide, 1-isopropyl-5-hexylbiguanide, 1-ethyl-5-phenylbiguanide, 1,5-diphenylbiguanide, and 1,5-di-o-tolylbiguanide.

The reaction of acetonitrile with phenylbiguanide may be illustrated as follows:

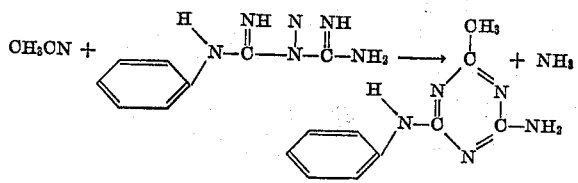

The invention is further illustrated, but not limited, by the following examples:

EXAMPLE 1

*2-amino-4-phenylamino-6-(α-propoxyethyl)-s-triazine*

A mixture consisting of 35.4 g. (0.20 mole) of phenylbiguanide, 28.6 g. (0.20 mole) of α-propoxypropionitrile, 2 g. of 85% potassium hydroxide and 45 cc. of 2-ethoxyethanol was refluxed (maximum temperature of 135° C.) for about 4 hours, then cooled to room temperature and poured into one liter of water. The aqueous phase was decanted from the precipitated gum, and the latter was crystallized from aqueous ethanol. Recrystallization from acetonitrile gave 23 g. of the white crystalline product melting at 100–102° C.

EXAMPLE 2

*2,4-diamino-6-t-butoxymethyl-s-triazine*

A mixture consisting of 30.3 g. (0.30 mole) of biguanide, 33.9 g. (0.30 mole) of t-butoxyacetonitrile, 3 g. of 85% potassium hydroxide and 60 cc. of 2-ethoxyethanol was refluxed for three hours. The guanamine began to crystallize as soon as the reaction mixture reached a temperature of about 80° C. The product was filtered cold, washed with methanol and then with water. After drying at 110° C., the white crystalline compound weighed 41 g. and melted at 235–240° C.

EXAMPLE 3

*2,4-diamino-6-(α-t-butoxyethyl)-s-triazine*

The reaction of biguanide (0.30 mole) with α-t-butoxypropionitrile (0.30 mole) was carried out according to the procedure of Example 2. The crude guanamine weighed 38 g. and melted at 174–176° C. Recrystallization from aqueous 2-methoxyethanol gave the white crystalline product melting at 181–182° C.

EXAMPLE 4

*2-amino-4-methyl-6-phenylamino-s-triazine*

A mixture consisting of 20 g. of phenylbiguanide, 20 cc. of acetonitrile, 0.5 g. of 85% potassium hydroxide and 25 cc. of 2-methoxyethanol was refluxed for three hours, then cooled to room temperature and diluted with 100 cc. of water. The precipitated guanamine was separated by filtration and recrystallized from ethanol. The white crystalline product melted at 177–178.5° C.

EXAMPLE 5

*2,4-diamino-6-isopropoxymethyl-s-triazine*

A mixture consisting of 100 g. of biguanide sulfate, 50 g. of isopropoxyacetonitrile, 73 g. of 85% potassium hydroxide and 200 cc. of 2-methoxyethanol was heated slowly to boiling and refluxed for two hours. The reaction mixture was cooled to room temperature and filtered. The crude product (73 g.) was recrystallized from 800 cc. of water. The white crystalline compound melted at 226–229° C.

EXAMPLE 6

*2-amino-4-(α-t-butoxyethyl)-6-isopropylamino-s-triazine*

A mixture consisting of 35.9 g. of isopropylbiguanide hydrochloride, 25.4 g. of α-t-butoxypropionitrile, 16 g. of 85% potassium hydroxide and 60 cc. of 2-ethoxyethanol was refluxed for two hours, then cooled to room temperature and filtered. The filtrate was diluted with an equal volume of water, thus precipitating the guanamine as an oil which gradually crystallized. The crude product was separated by filtration and recrystallized from 50% methanol. The white crystalline compound melted at 149–150° C.

EXAMPLE 7

*2-t-butoxymethyl-4,6-bis(o-tolylamino)-s-triazine*

A mixture consisting of 11.5 g. of 1,5-di-o-tolylbiguanide, 4.6 g. of t-butoxyacetonitrile, 0.5 g. of 85% potassium hydroxide and 10 cc. of 2-ethoxyethanol was heated at reflux for 3.5 hours, then cooled to room temperature and diluted with an equal volume of methanol. The precipitated guanamine was separated by filtration and recrystallized from ethanol. The white crystalline product melted at 157–157.5° C.

The guanamines prepared by the method of the present invention condense readily with formaldehyde or with urea-formaldehyde condensation products in the presence of acid-reacting catalysts. The resinous products thus prepared are useful in the manufacture of molded articles, impregnated wood, impregnated paper, coatings and adhesives. A typical example is as follows: 198 parts (1.0 mol) of the guanamine of Example 2 above was mixed with 162 parts (2.0 mols) of 37% methanol-free formaldehyde. A solution of 2 N. hydrochloric acid was added to adjust the pH of the mixture to 6.0–6.5. The slurry was heated to reflux temperature (100° C.) for one hour, during which, solution of the guanamine took place. Reaction was continued until a reflux hydrophobe stage was reached. The resinous solution was cooled to about 60° C., made alkaline by the addition of a 2 N. solution of sodium hydroxide, and dehydrated in a vacuum drying kettle at 52 mm. Hg until the temperature of the resin reached 115°–120° C. The product was cooled to room temperature, and then ground into a white, dry, free-flowing powder. 70 parts of the resinous product was mixed with 30 parts of an alkyd resin modifier (short oil non-oxidizing alkyd resin), and utilized as a low pressure laminating resin. Alpha cellulose paper was treated with the modified resin, dried with infra-red heat, and utilized in surfacing woodwaste structural boards. An excellent surface with high gloss, bake resistance, solvent resistance and alkali stain resistance was obtained.

While the invention has been described with particular reference to specific embodiments, it is to be understood that it is not to be limited thereto but is to be construed broadly and restricted solely by the scope of the appended claims.

I claim:
1. A method of preparing a guanamine of the formula

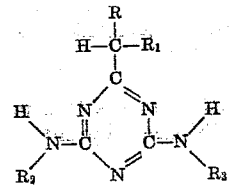

in which R represents a member of the group consisting of hydrogen and an alkyl radical containing not more than eighteen carbon atoms, $R_1$ represents a member of the group consisting of hydrogen and an alkoxy radical containing not more than six carbon atoms, and $R_2$ and $R_3$ are chosen from the group consisting of hydrogen, phenyl, tolyl, naphthyl, and an alkyl radical containing not more than eighteen carbon atoms, which comprises reacting a nitrile of the formula

with a biguanide of the formula

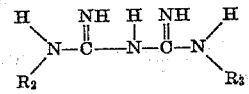

in the presence of a basic catalyst in an inert organic solvent, and recovering the thus-formed guanamine from the reaction mixture.

2. The method of claim 1 in which the reaction is carried out at a temperature within the range of from about 75° C. to 150° C.

3. The method of claim 1 in which the catalyst is an alkali metal hydroxide.

4. The method of claim 1 in which the solvent is a low molecular weight monoalkyl ether of ethylene glycol.

References Cited in the file of this patent
UNITED STATES PATENTS 2,684,366    Simons ---------------- July 20, 1954